United States Patent
Krishnan et al.

(10) Patent No.: US 7,155,444 B2
(45) Date of Patent: Dec. 26, 2006

(54) PROMOTION AND DEMOTION TECHNIQUES TO FACILITATE FILE PROPERTY MANAGEMENT BETWEEN OBJECT SYSTEMS

(75) Inventors: Prasanna V. Krishnan, Bellevue, WA (US); Sambavi Muthukrishnan, Woodinville, WA (US); Sameet H. Agarwal, Redmond, WA (US); Balan Sethu Raman, Redmond, WA (US); Michael Eric Deem, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 101 days.

(21) Appl. No.: 10/693,090

(22) Filed: Oct. 23, 2003

(65) Prior Publication Data

US 2005/0091285 A1 Apr. 28, 2005

(51) Int. Cl.
*G06F 17/30* (2006.01)

(52) U.S. Cl. ............... 707/101; 707/102; 707/103; 707/200; 707/205

(58) Field of Classification Search ........ 707/200, 707/204, 205, 102, 103, 100, 3, 101; 715/513–514
See application file for complete search history.

(56) References Cited

U.S. PATENT DOCUMENTS

| | | | |
|---|---|---|---|
| 5,873,092 A | | 2/1999 | Cheng et al. |
| 6,061,696 A | * | 5/2000 | Lee et al. .............. 715/513 |
| 6,363,386 B1 | | 3/2002 | Soderberg et al. |
| 6,385,606 B1 | * | 5/2002 | Inohara et al. .............. 707/4 |
| 6,429,882 B1 | * | 8/2002 | Abdelnur et al. .......... 715/763 |
| 6,611,840 B1 | | 8/2003 | Baer et al. |
| 6,704,432 B1 | | 3/2004 | Eversole et al. |
| 6,708,189 B1 | * | 3/2004 | Fitzsimons et al. ........ 707/205 |
| 6,728,685 B1 | * | 4/2004 | Ahluwalia ................. 705/26 |
| 6,779,154 B1 | * | 8/2004 | Nussbaum et al. ........ 715/523 |
| 6,799,184 B1 | * | 9/2004 | Bhatt et al. .............. 707/102 |
| 6,868,423 B1 | * | 3/2005 | Ohta et al. ............... 707/102 |
| 2003/0076978 A1 | | 4/2003 | Eversole et al. |

OTHER PUBLICATIONS

K. Kourai, et al.; Operating System Support for Easy Development of Distributed File Systems; Technical Report TR-98-01, Department of Information Science, University of Tokyo, 1998.
International Search Report dated Jan. 4, 2005 for PCT Application Serial No. PCT/US04/24295, 4 Pages.

* cited by examiner

*Primary Examiner*—Cam-Y Truong
(74) *Attorney, Agent, or Firm*—Amin & Turocy, LLP

(57) ABSTRACT

The present invention relates to a system and methodology to facilitate interoperability and compatibility between disparate data systems. In one aspect, a file transformation system is provided having at least one file associated with one or more unstructured properties. A file property handler manipulates the unstructured properties in accordance with one or more structured properties associated with a structured object store environment. If an unstructured file is to be operated in the context of a structured object store environment, a promotion operation is performed to update unstructured properties in the file with structured properties suitable for operation in the structured object store environment. If a promoted item were to be manipulated in the structured object store environment, a demotion operation or reverse transformation is performed to update properties in the file.

26 Claims, 9 Drawing Sheets

PROMOTION AND DEMOTION TECHNIQUES TO FACILITATE FILE PROPERTY MANAGEMENT BETWEEN OBJECT SYSTEMS

TECHNICAL FIELD

The present invention relates generally to computer systems, and more particularly to a system and method that employs file property handlers to facilitate compatibility between unstructured file property storage in byte streams and structured object representations of the file via promotion and demotion of file properties. The term item employed herein generally refers to a structured, schematized object that is stored in a structured object store. A file-backed item refers to a structured object representation of the file in an object store. The term file can be used to represent an unstructured byte stream that corresponds to a given file-backed item.

BACKGROUND OF THE INVENTION

Traditionally, in a computer file system, a file is the basic unit of data storage. Typically, a file in a file system has the following characteristics. It is a single sequence of bytes. It has a finite length and is stored typically in a non-volatile storage medium. It is created in a directory and has a name that it can be referred to by in file operations, possibly in combination with its path. Additionally, a file system may associate other information with a file, such as permission bits or other file attributes; timestamps for file creation, last revision, and last access etc. Specific applications can also store domain-specific properties in the byte stream of the file. For example, files that are used by a word processing application and hence considered as 'documents' may store properties like the Title and Author of the document. These properties are stored within the byte stream of the file in a format that is specific to the application creating the file. The properties are not structured as objects, nor do they have standardized names. The byte streams are unstructured values. Another example would be that a file that stores a music clip has a number of interesting properties such as Genre, Author, Date Recorded, Artist etc. stored in the byte stream. In addition to this meta-data, there is a byte stream that represents the music itself in some universally recognized format. The programming model in dealing with these properties is geared towards manipulating the whole byte stream. The programming model is a bind-reference model which results in a handle being manufactured for the bound instance (the result of a CreateFile/OpenFile call). The subsequent manipulation of the value is done by ReadFile/WriteFile to retrieve and update the relevant portions of the byte stream.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate file manipulation as a structured object and as a file byte stream by enabling property storage in the byte stream and properties of a structured object representation of a file synchronized when they are independently updated. It is given that there are suitable application programming interfaces for manipulating the file-backed item in an object store and for manipulating the file as an unstructured byte stream. A file property handler is provided to enable unstructured properties in files to be appropriately mapped to and kept consistent with a file-backed item representation for the file via system interactions, methods, and procedures referred to as promotion and demotion. Promotion is invoked when an application attempts to modify or manipulate a file by directly manipulating the byte stream corresponding to the file. Thus, promotion is the process whereby the file property handler updates structured file properties in the object store when an application updates unstructured file properties in the byte stream in order to achieve consistency between the two environments. Promotion of the unstructured file properties into an object in the structured object store facilitates various objectives such as, for example:

a) A structured object store allows efficient querying of files based on their properties. This is generally not possible with properties stored in unstructured byte streams.

b) Unstructured properties are represented as well-structured objects that adhere to a standardized object representation. Thus, applications can operate easily with these objects using an object-oriented programming model rather than the model of manipulating the byte stream.

If a promoted file-backed item in the object store is then manipulated and updated, the file property handler facilitates a demotion process, wherein a reverse transformation is performed to update properties in the unstructured file corresponding to the changes in the structured object. In this manner, promotion and demotion enable file properties to be automatically updated and maintained in accordance with the properties suitable for the target system at hand (e.g., update unstructured properties to structured properties via promotion and visa versa via demotion).

In one aspect of the present invention, a bridge component (e.g., file property manager) communicates with a file property handler to cause transformation of unstructured properties in the file byte stream to a structured object when an application manipulates and saves properties to an unstructured file. The file property manager utilizes mechanisms exposed by the unstructured file store to track modified unstructured files that are to be updated in the object store.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate the manipulation of a file as an unstructured byte stream and a structured object by enabling them to be consistent when one is updated independent of the other through specific application programming interfaces.

A file property handler manipulates the unstructured properties in the file in accordance with one or more structured object properties associated with the corresponding file-backed item. A promotion operation is performed to update the file-backed item with structured properties whenever the unstructured file stream is directly updated. Similarly, if the file-backed item were manipulated and updated with application programming interfaces used in the structured object environment, a demotion operation or reverse transformation is performed to update properties in the unstructured representation of the file.

As used in this application, the terms "component," "handler," "manager," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
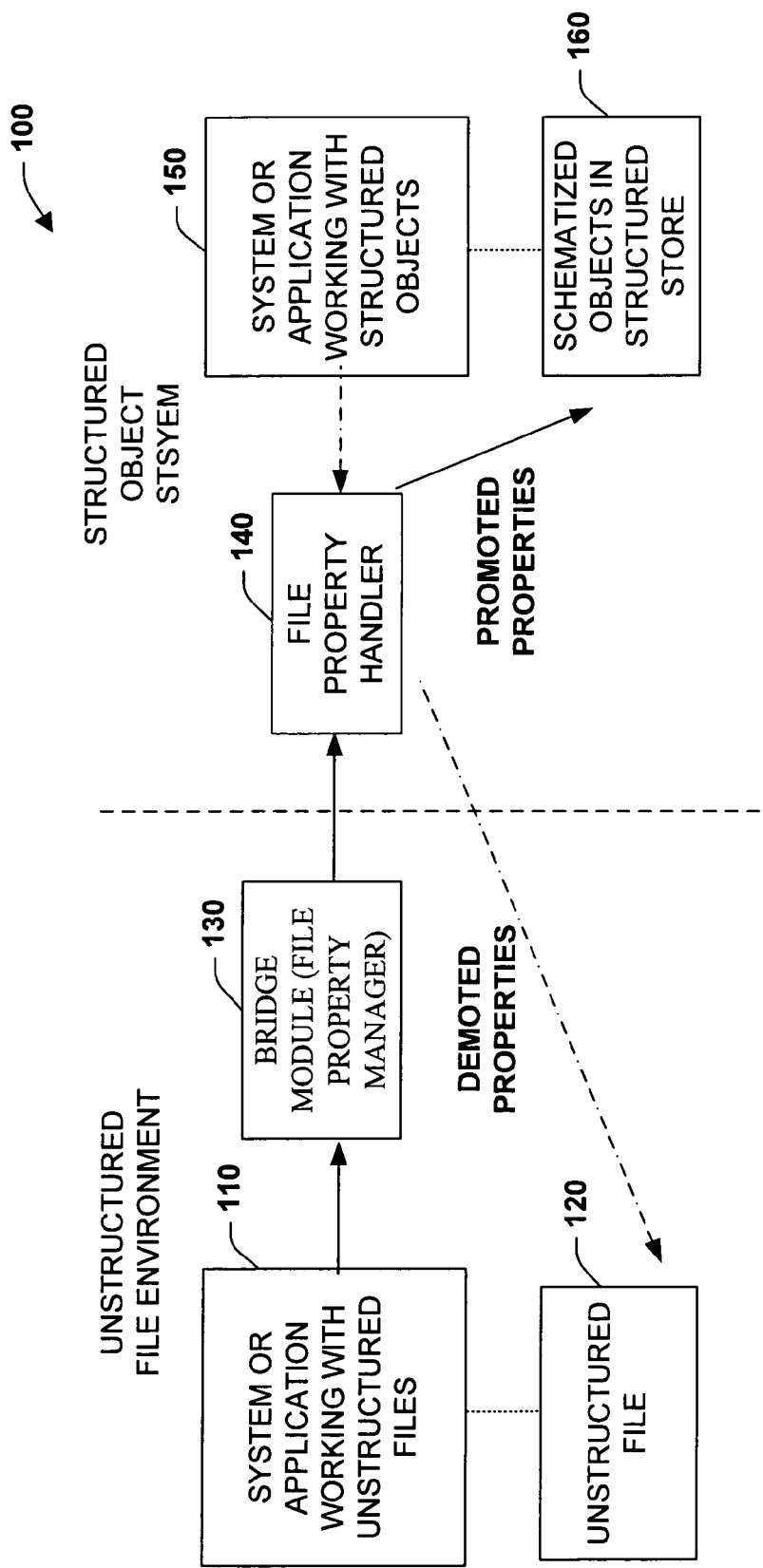
FIG. 1 is a schematic block diagram of a file transformation system in accordance with an aspect of the present invention.

Referring initially to FIG. 1, a file transformation system 100 is illustrated in accordance with an aspect of the present invention. The system 100 includes a system or application 110 that is typically associated with one or more unstructured files 120, wherein the application 110 and file are generally associated with an unstructured file environment. A bridge module 130 and file property handler 140 are provided to facilitate communications and compatibility with a structured object system or application 150 that is generally associated with a structured object store environment. In one example, the structured system application may be associated with one or more schematized objects at 160 that are typically associated with code such as XML, for example.

If a file were to be modified, saved, and/or manipulated as an unstructured file, the bridge module or file property manager 130 serves to direct the transformation from the unstructured file to the structured object. The transformation is performed by the bridge module 130 invoking the file property handler 140 which would in turn perform a promotion operation to transform unstructured properties of an unmanaged file to structured properties associated with applications that operate against the structured store 160. If the promoted object were to be manipulated from the structured store application, then the file property handler 140 performs a demotion operation which causes properties to be reverse transformed into properties that are then updated in the unstructured file.

In one aspect, promotion operates when a file-based application 110 continues to modify properties by updating a file stream corresponding to a structured object, also known as a file-backed item. Thus, promotion can be modeled as a process of updating a copy of these properties that are in the item in the structured object system 160 in order that the item reflects the changes made by updating the file. In contrast, demotion operates when a new application working against the structured store queries for and modifies items using a structured object Application Programming Interface (API), for example, irrespective of whether the items are file-backed items or not. In the case of file-backed items, some of these properties (which were earlier promoted from the file) are then written back to the file. This process is called demotion, which is in essence a reverse transformation of promotion.

With respect to the file property handler 140, promotion and demotion are achieved by calling a code module, called a File Property Handler (FPH) that determines how to promote properties from and/or demote properties back into a given file. The FPH 140 is typically registered to process one or more selected file extensions. It is noted that the FPH 140 may decide, in some cases, to implement only Promote or Demote functions. As described herein, the term 'promoter' if used refers to an FPH that is being discussed in the context of promotion and 'demoter' as an FPH in the context of demotion.

The bridge component 130 (also referred to as a file property manager) interacts with the FPH 140 to facilitate promotion and demotion. Thus, on receiving an entry from a promotion change queue (described below), the bridge component 130 calls a suitable FPH 140 for a file with a pointer to a stream of the file to be promoted. The FPH 140 then performs extraction and transformation (described below) of the unstructured properties in a file to the structured properties of a managed item that is stored in the structured object store 160. With respect to demotion, a structured object API calls the demoter when an item is updated in the structured object store 160. The demoter employs a reverse transformation and extraction code to write the updated properties back to the file. The extraction portion of the FPH 140 uses an API that is specific to the file format to extract properties. It is noted that there is generally one registered FPH 140 called for a given file.

Figure 2:
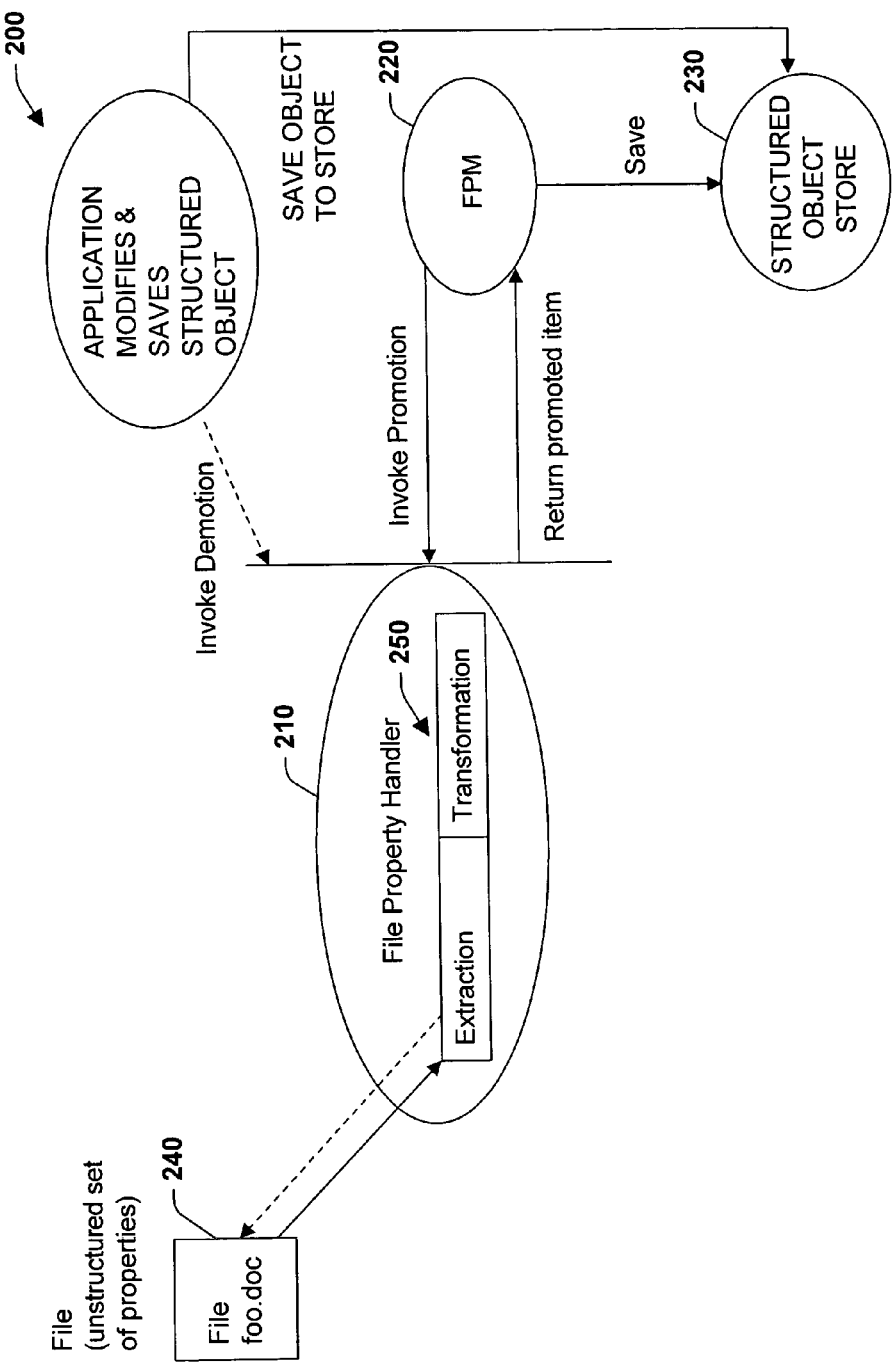
FIG. 2 is a schematic block diagram of more detailed file transformation system in accordance with an aspect of the present invention.

Referring now to FIG. 2, a more detailed transformation system 200 is illustrated in accordance with an aspect of the present invention. The system 200 represents a logical model for promotion and/or demotion. In this aspect, one or more FPHs 210 (File Property Handler) reside in managed code. A FPM 220 (File Property Manager) acts as an interoperability or bridge component to the managed FPHs 210. The FPM 220 generally runs as a separate process, distinct from the process maintaining an actual object store 230. As noted above, an abstract BaseFilePropertyHandler class can be provided which defines methods for promotion and demotion. Thus, the File Property Handler 210 is modeled as a concrete managed class deriving from the abstract BaseFilePropertyHandler class that implements methods to be invoked in promotion and/or demotion. For example, the FPM 220 can instantiate the class to invoke promotion for a file with a particular file extension. The following code excerpts represent an example class designation:

```
using System;
using System.Storage;
using System.Storage.Base;
namespace System.Storage.FPM
{
    struct FPMContext
    {
        ItemContext itmCtxt;
        public string fileExtension;
    };
    abstract class BaseFilePropertyHandler
    {
        abstract public void Promote (
            ref Item         itm,         // File item (for write)
            FileStream       fStream,     // File stream (for read)
            PromotionContext ctx);        // Promotion context
        abstract public void Demote (
            Item             existingItm, // File item (for read)
            FileStream       fStream,     // File stream (for write)
            PromotionContext ctx);        // Promotion context
        abstract public void FirstPromote (
            ref Item         itm,         // File item (for write)
            FileStream       fStream,     // File stream (for write)
            PromotionContext ctx);        // Promotion context
        abstract public void StoreSerializedItem(
            Item             existingItm, // File item (for read)
            FileStream       fStream,     // File stream (for write)
            PromotionContext ctx);        // Promotion context
        abstract public void RetrieveSerializedItem(
            ref Item         itm,         // File item (for write)
            FileStream       fStream,     // File stream (for read)
            PromotionContext ctx);        // Promotion context
    };
}
```

Promotion is invoked when a file stream of a file-backed item is modified using a File API by applications that work with files. Thus, promotion should be invoked when such an application is used to modify a file in a structured store namespace. There generally should not be any promotion for files that are not migrated to a structured store namespace and that continue to exist in an unstructured file environment. When a file in the structured store namespace is modified by an application that uses file API, the file promotion manager 220 or service asynchronously invokes the FPH 210 on this file to update the item corresponding to the file. Typically, one FPH 210 is registered per file extension. When there is a pending promotion on a file-backed item, a 'promotionStale' flag on the item is set to 1.

As illustrated in FIG. 2, if an application working with unstructured files 200 modifies a file 240 in the structured store namespace at 230, the FPH 210 performs an extraction and transformation of unstructured properties at 250, before returning the promoted item to be saved at 230. In contrast, demotion is generally invoked when a file-backed item is updated through a structured store API 200. The structured store API 200 allows applications to modify one or more file-backed items or parts of such items. After performing this, when the application tries to save the changed item(s) using the structured store API, the method in the structured store API that is invoked to do the save performs the following: The method in the structured store API that performs the function of saving the item is conceptually referred to here as the 'save' method, although the exact method name is implementation-dependent.

If a file-backed item, or a part of it is modified through the structured store API, the structured store API's save method looks up the demoter corresponding to the file-backed item (based on file extension) and invokes it. The demoter takes in an item (or part of it) for read-write and a file stream for write and updates the file content based on the changes to the item. Demotion is a generally a synchronous operation since it is invoked during the operation that tries to save the item to the structured store. The save method described above updates the file 240 by invoking the demoter as well as write suitable properties to the item in the structured data store.

FIGS. 3–6 illustrate automated promotion and demotion processes for file property handlers and file property managers in accordance with an aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 3:
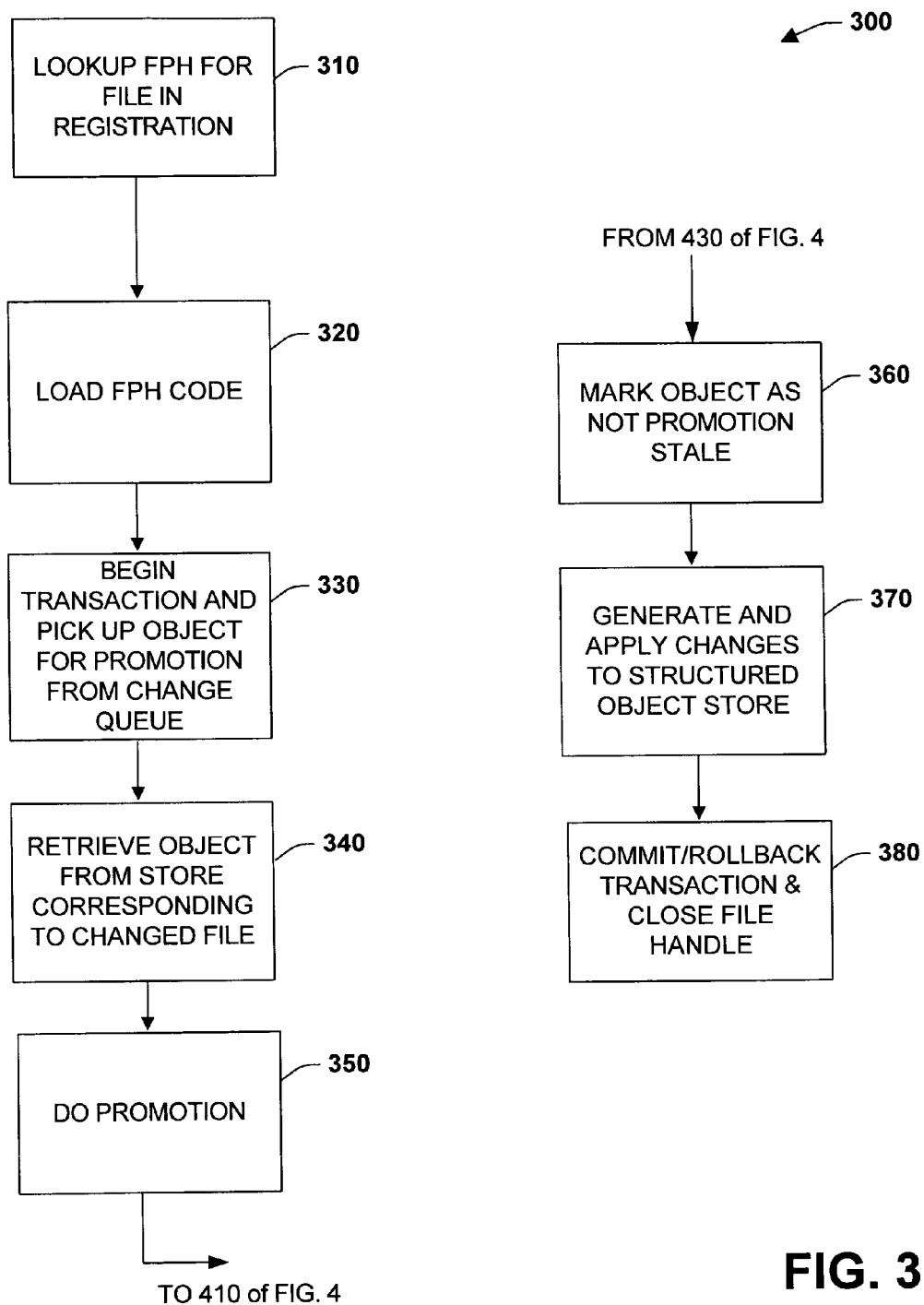
FIGS. 3–6 are flow chart diagrams illustrating automated promotion and demotion processes for file property handlers and file property managers in accordance with an aspect of the present invention.
Figure 4:
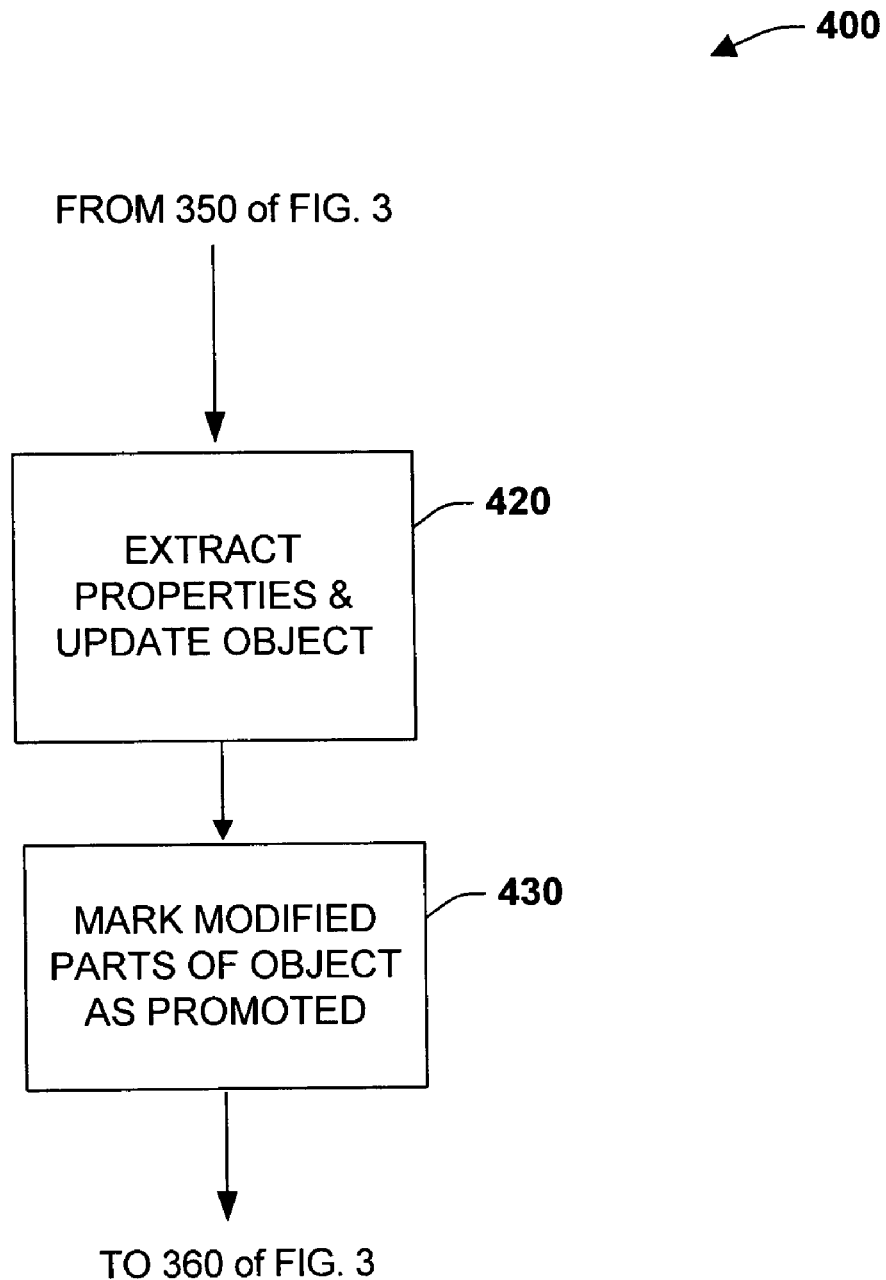

FIGS. 3 and 4 are discussed concurrently, wherein FIG. 3 represents processes for a file program manager (FPM) during promotion and FIG. 4 represents processes for a file property handler (FPH) during promotion. In general, Files are queued up for promotion in a queue referred to as a Change Queue. The following are the acts involved in promoting after a file program manager receives a file-backed item from the Change Queue. At 310, the FPM looks-up an FPH for the file by looking up the FPH registration info from a structured store that the file is on. At 320, the FPM loads the corresponding FPH. For example, this can be achieved by loading the FPH assembly from a Global Assembly Cache for the respective machine, and retrieving an instance of the FPH class. At 330, the FPM begins a transaction and dequeues the item from the Change Queue. At 340, the FPM retrieves a structured store item (I1) corresponding to the file that was changed. At 350, the FPM performs promotion by calling the appropriate method(s) on the FPH.

After 350, the process proceeds to 410 of FIG. 4 that relates to FPH processing. At this point the FPH may first change the structure of the item. At 420, the FPH extracts properties, and updates the item based on the properties. At 430, the FPH marks modified parts of the item as promoted. After 430, the process proceeds back to 360 of FIG. 3 for further FPM processing. At 360, the FPM marks the item as not promotionStale. At 370, the FPM applies the changes to the structured object store. At 380, the FPM performs a commit/rollback transaction and closes a file handle.

Figure 5:
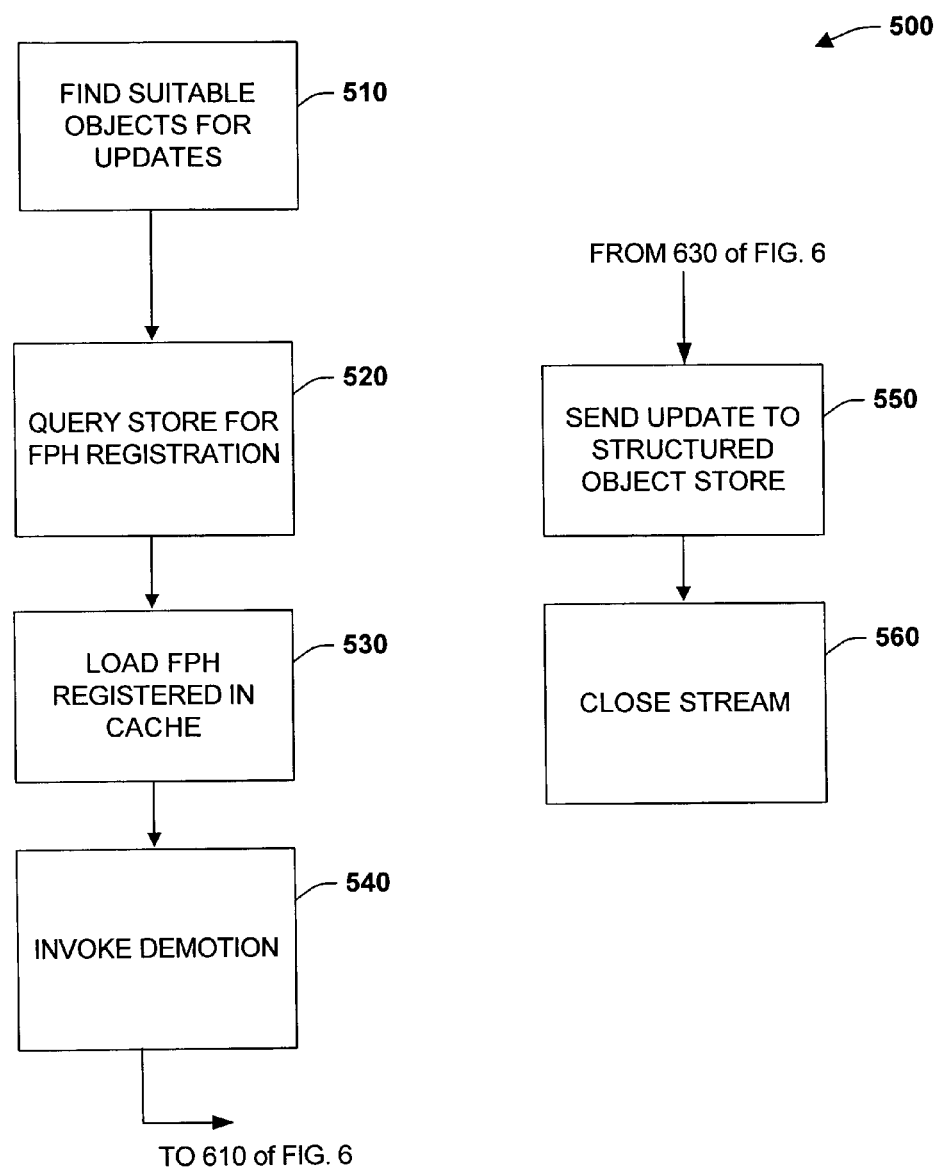
Figure 6:
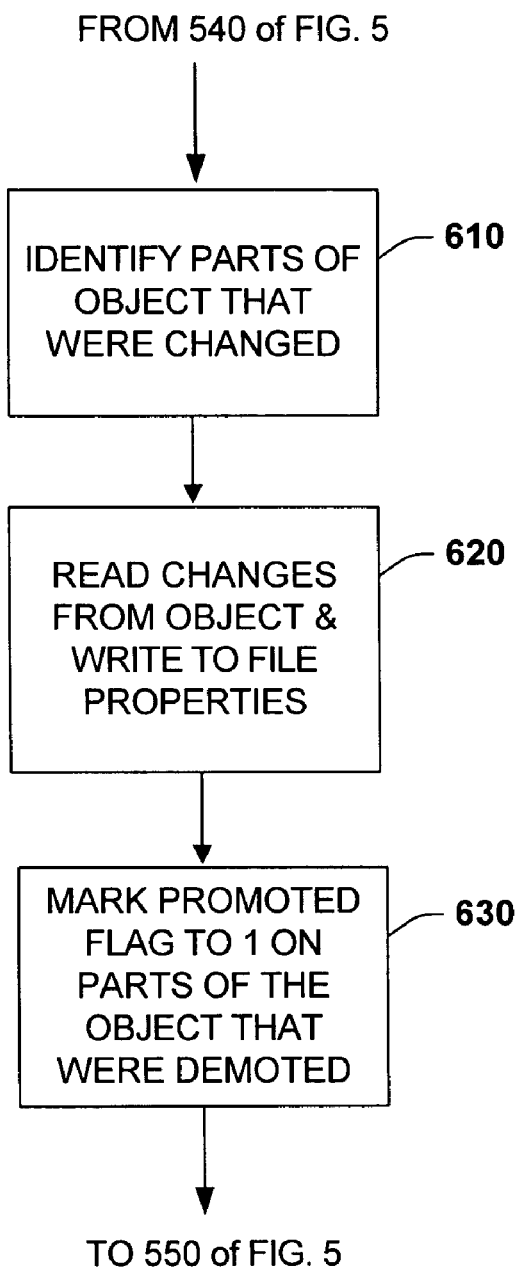

FIGS. 5 and 6 are discussed concurrently, wherein FIG. 5 represents processes for the structured store save function (defined earlier) during demotion and FIG. 6 represents processes for a file property handler (FPH) during demotion. Proceeding to FIG. 5, the following acts are performed for the item that was modified. At 510, the update function checks if it is a file-backed item. If it is not, demotion code is bypassed and normal processing for a non file-backed item is commenced, otherwise determine the appropriate item for updates performed on only parts of an item which are file-backed. This can be achieved by looking up an is FileBacked bit that is associated with the item in the structured object store.

At 520, the save function queries the store where the file-backed item resides (this could be on another machine in the case of a remote file) to check for the FPH registered for this file extension. This returns details about (e.g. the assembly name & version It) the FPH that promoted the file. At 530, the update function loads the appropriate FPH (e.g. it may be registered in a Global Assembly Cache of the respective machine) based on the above information. At 540, the save function invokes method(s) on the FPH in order to perform demotion. The changed item also contains a record of the changes that were made to the Item. These changes are tracked by the structured store API.

After 540, the process proceeds to 610 of FIG. 6 for further FPH processing. At 610, the FPH looks at tracked changes in the item to identify what fields need to be demoted. At 620, the FPH reads changes from the item, writes to file properties. This may also include calling the structured store API to read other information from the store. At 630, The FPH marks a 'promoted' flag to 1 on the item or parts of it that are demoted. The process then proceeds back to 550 of FIG. 5 for further save function processing. At 550, the save function applies the changes made to the item to the store. At 560, the save function closes the stream and commits the transaction on the file.

As noted previously, processing may differ with respect to a "first promotion." The act of first promotion is generally distinguished from other promotions. This may be due to that first promotion may need to bring the item and file in sync with each other.

Figure 7:
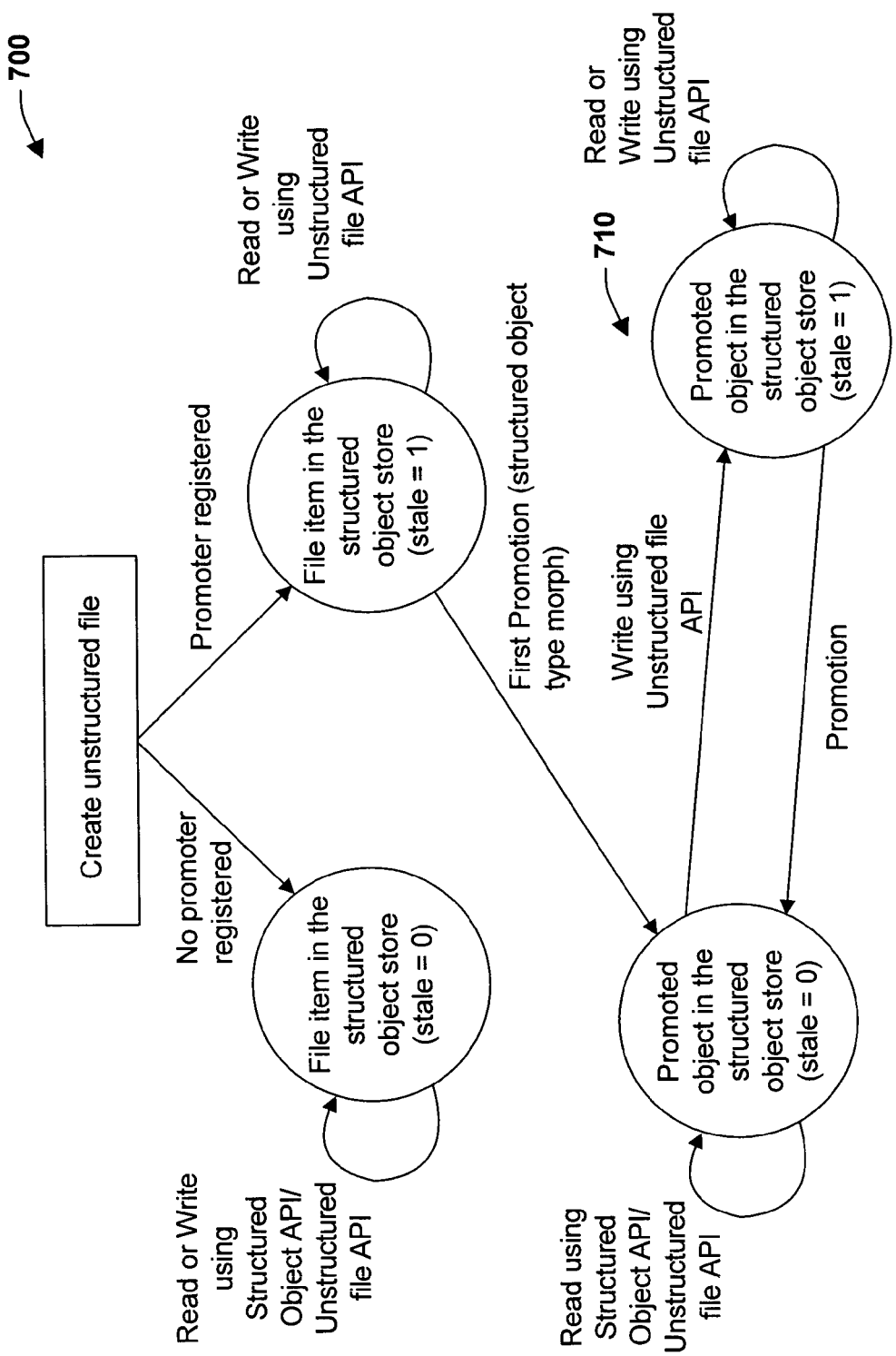
FIG. 7 is a state diagram for an item in accordance with an aspect of the present invention.

FIG. 7 illustrates a state diagram 700 for a file backed item in accordance with an aspect of the present invention. Given the discussion above, states for a file-backed item are depicted in the diagram 700. A structured store API cannot update a file-backed item with promotionStale=1. The 'promotionStale' bit on an item is true if it is a file-backed item and there is a promotion pending in the item at 710. An application that desires to update a file-backed item using a structured store API and thus invoke demotion may operate as follows:
1) Fetch the item
2) Query if the item is 'promotionStale'
3) If item is stale
   call 'SynchronousPromote' method in the API to bring the item up-to-date.
Note: 2 and 3 are optional.
4) Update the fetched item
5) Call the structured store API's save method to try to save the item.
6) If save succeeds in demotion, done.
7) else
8) if error code returned is 'Item Is PromotionStale' (This would be if the app did not perform 2 and 3 above)
   call 'SynchronousPromote' method in the API to bring the item up-to-date. Returns updatedItem.
      Go to 4 above to apply the changes on the updatedItem.
9) if error code returned is 'Item Has been Updated'
   Go to 4 above.

There is in general one FPH registered per file type. However, in the case where a file format is extensible, new properties can be added to the unstructured properties in the file that the FPH was not aware of when it was developed. There are different extensibility schemes supported by the system to allow the FPH for a given file type to be extended to promote/demote the new or custom properties added by software-vendors/solution providers other than the FPH-writer as well as end-users. This makes it possible to transform the newly added unstructured file properties also into new structured properties on the item. Exemplary extensibility schemes are described below:

1. A software-vendor/solution provider who adds simple unstructured properties to a file and wants these transformed into simple structured properties on the item can do the following:
   a) Add corresponding new simple structured properties to the item and
   b) Specify declaratively, using an XML scheme, how the newly added unstructured properties should be transformed into the newly added structured item properties.

The main FPH registered for the file type would implement these conversions (during both promotion and demotion) thus not requiring the vendor extending the file to write any new code.

2. A software-vendor/solution provider who adds unstructured properties to a file and wants these transformed into more complex structured properties on the item or establish relationships between items can do the following:
   a) Add corresponding complex structured properties to the item and
   b) Write code that uses the structured store API to transform the unstructured properties into the newly added structured item properties or establishes relationships between items. This code would be analogous to the implementation of the main FPH for the file type.

3. End-users may add new properties to a file. These are promoted and demoted into a default property set on the structured item representation of the file.

Figure 8:
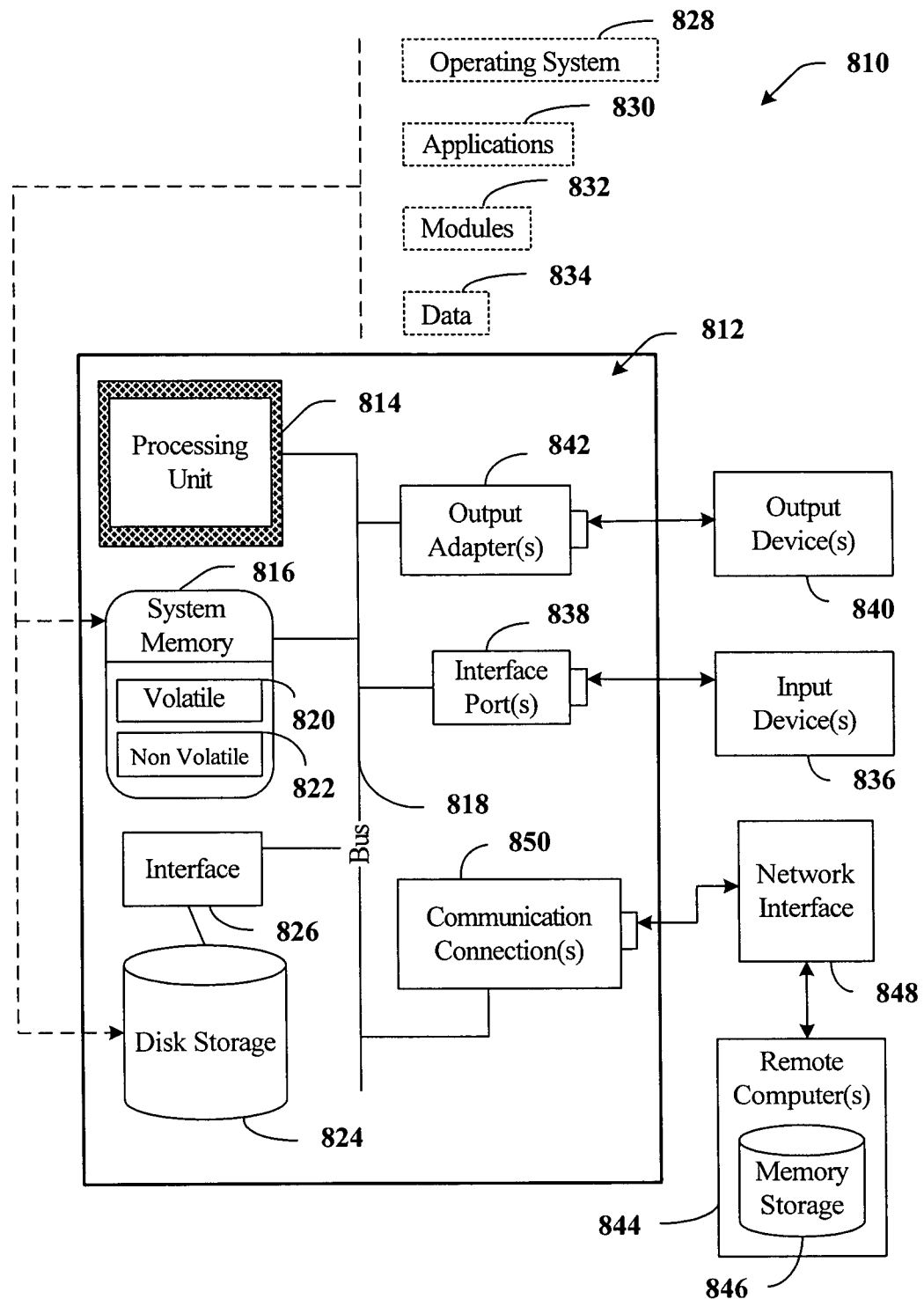
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To Facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
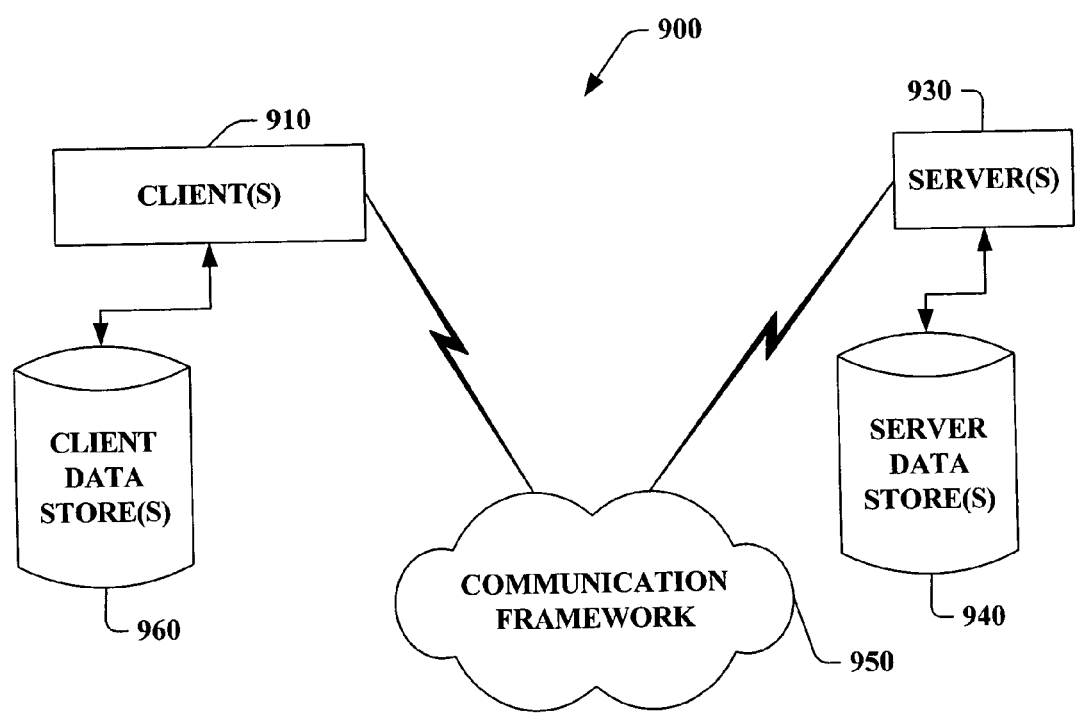
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented file transformation system including a processor, comprising:
   a file having one or more unstructured properties;
   an item having one or more structured properties, the item being a structured object representation of the file;
   a file property manager facilitates communications between applications working with an unstructured byte stream and applications working with the structured object representation of the file, the file property manager receives a notification of the unstructured byte stream of the file having been modified and calls a file property handler with a pointer to the byte stream of the file to be promoted; and the file property handler manipulates at least one of the following: a transformation in order to demote the one or more unstructured properties based on changes to the structured properties and a transformation in order to promote the structured properties based on changes to the unstructured properties;

the file property handler facilitates the promotion when a file application programming interface (API) based application modifies the unstructured properties by updating the unstructured byte stream for a structured object store item, the structured object store item being a file-backed item;

the file property handler performs at least one of the following: demoted one or more unstructured properties and storing the promoted structured properties.

2. The system of claim 1, the file property handler performs at least one of an extraction and a transformation in order to promote the unstructured properties to the structured properties.

3. The system of claim 1, the file property handler performs at least one of an extraction and a transformation in order to demote the structured properties to the unstructured properties.

4. The system of claim 1, the file property handler facilitates a demotion operation when an application queries for and modifies items employing a structured store Application Programming Interface (API) that manipulates the file-backed item.

5. The system of claim 1, the file property handler is registered to process one or more selected file extensions.

6. The system of claim 1, the file property handler is associated with an abstract class that defines methods for promotion and demotion.

7. The system of claim 6, the abstract class includes at least one of a BaseFilePropertyHandler, a promote method, a demote method, a first promote method, a store serialized item method, and a retrieve serialized item method.

8. The system of claim 1, further comprising an application programming interface (API) that allows applications to modify a file-backed item.

9. A computer readable medium having computer readable instructions stored thereon for implementing the file property handler of claim 1.

10. A computer implemented system including a processor to facilitate data transformation, comprising:

means for exposing unstructured file properties to a structured store application, the unstructured file properties are related to a file that is an unstructured byte stream;

means for facilitating communications between applications working with the unstructured file properties and applications working with a structured object representation of the file;

means for receiving a notification that the unstructured byte stream of the file has been modified;

means for calling a file property handler for the file with a pointer to the unstructured byte stream of the file to be promoted;

means for transforming the unstructured file properties into structured item properties associated with the structured store application, the structured item properties are related to an item being the structured object representation of the file;

means for facilitating a promotion operation when a file application programming interface (API) based application modifies the unstructured properties by updating the unstructured byte stream for a structured object store item, the structured object store item being a file-backed item;

means for updating the structured item properties in the structured store application; and means for storing the updated structured item properties.

11. The system of claim 10, further comprising means for transforming the structured item properties into unstructured file properties.

12. A computer implemented method to facilitate data item transformation, comprising:

performing communications between applications working with an unstructured property file stream and applications working with a structured object representation of a file;

modifying the file associated with one or more unstructured properties in a structured store namespace via utilizing a file application programming interface (API) based application;

receiving a notification related to the modification of the unstructured property file stream of the file;

calling a file property handler for the file with a pointer corresponding to the modified unstructured property file stream to perform a promotion;

performing a promotion operation when a file application programming interface (API) based application modifies the unstructured properties by updating the file stream for a structured object store item, the structured object store item being a file-backed item;

promoting one or more unstructured properties associated with the file to accordingly update structured properties associated with an item that is associated with the structured store namespace, the item is a structured object representation of the file in an object store;

storing the updated structured properties.

13. The method of claim 12, further comprising demoting one or more properties associated with the item to be in accordance with the file API based application.

14. The method of claim 13, further comprising determining the item for updates to parts of the item.

15. The method of claim 13, further comprising querying an item store for a file property handler registration.

16. The method of claim 15, further comprising loading the file property handler into a cache.

17. The method of claim 13, further comprising automatically identifying fields to be updated.

18. The method of claim 13, further comprising reading changes from an item and updating unstructured file properties.

19. The method of claim 18, further comprising at least one of sending the item changes to the store and closing a stream.

20. The method of claim 12, further comprising registering a file property handler to facilitate promoting the one or more unstructured properties or demoting the one or more structured properties.

21. The method of claim 12, further comprising dequeuing a change item.

22. The method of claim 12, further comprising retrieving a structured item for a selected item path.

23. The method of claim 12, further comprising morphine an item's structure or changing an item structure.

24. The method of claim 12, further comprising automatically extracting the one or more unstructured properties and updating an item.

25. The method of claim 12, further comprising marking modified parts of an item as promoted.

26. The method of claim 12, further comprising applying changes to the item to the structured object store.

* * * * *